May 26, 1970 W. F. KOSONOCKY 3,514,715
MULTILAYERS, LIGHT-EMITTING SEMICONDUCTOR DEVICE
Filed June 29, 1967
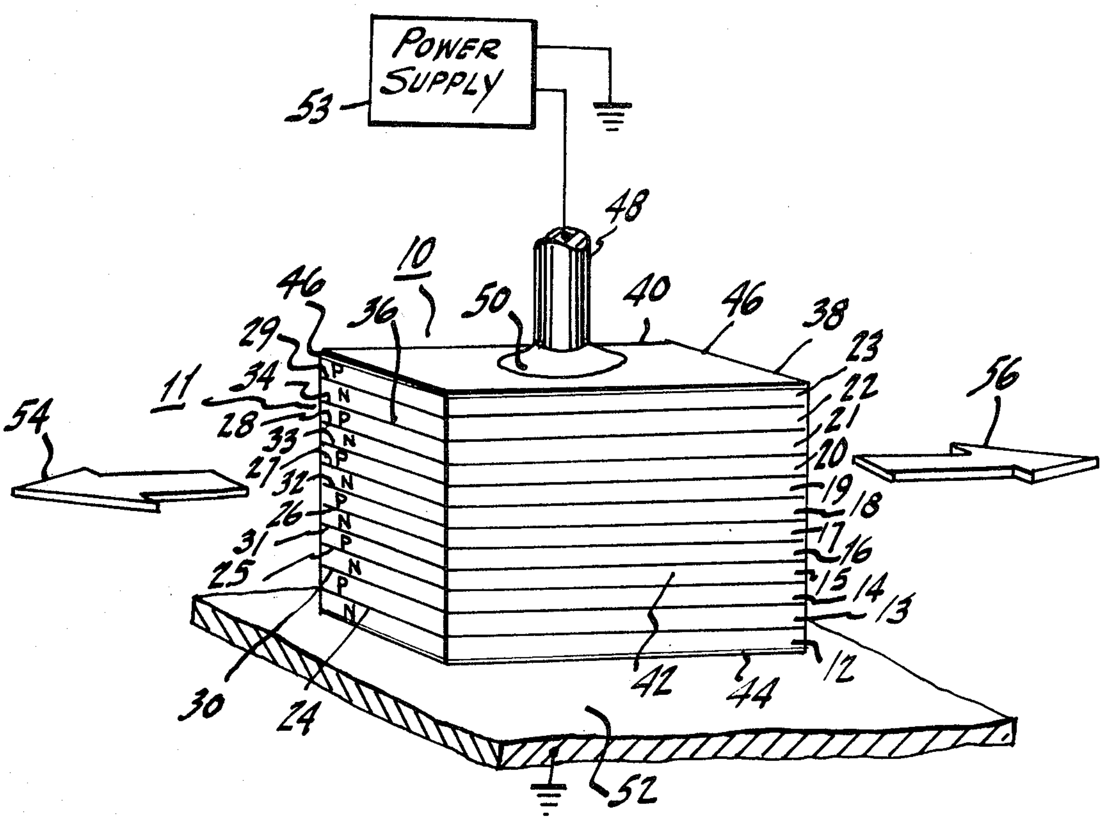
INVENTOR
WALTER F. KOSONOCKY
BY Arthur I. Spechler
ATTORNEY United States Patent Office 3,514,715

Patented May 26, 1970

3,514,715

MULTILAYER, LIGHT-EMITTING SEMICONDUCTOR DEVICE

Walter F. Kosonocky, Skillman, N.J., assignor to RCA Corporation, a corporation of Delaware Filed June 29, 1967, Ser. No. 650,107
Int. Cl. H01s 3/00
U.S. Cl. 331—94.5 8 Claims

ABSTRACT OF THE DISCLOSURE

A multilayer, light emitting, semiconductor device comprises a stack of at least four relatively thin, rectangular layers of semiconductor material. The layers are alternately of P type and N type conductivity, each of the layers forming a PN junction with an adjacent layer. The stack comprises a resonant cavity including two opposite light-reflecting ends that are perpendicular to the PN junctions. When a current of at least a threshold value is sent through the stack, an inverted population of charge carriers takes place adjacent each forward-biased PN junction, and stimulated emission of light is produced thereat. The layers of the stack are thin enough to be transparent and thus permit optical coupling between the light produced at adjacent forward-biased PN junctions, whereby the emitted light beam from the device comprises the synchronized combined emission from all of the layers of inverted population.

BACKGROUND OF THE INVENTION

This invention relates generally to light-emitting, semiconductor devices, and more particularly to a novel, multilayer, light-emitting, semiconductor device. The novel device is particularly useful as a source of a beam of light, such as a laser, having applications in the radar and navigation fields.

It has been proposed to provide light-emitting, semiconductor diodes, such as semiconductor injection laser diodes, wherein light is emitted from each diode when a threshold current is sent through it in a forward-biased direction. In the case of a single semiconductor diode laser, the light is emitted from a very thin source, diverging into about a 30 degree angle in the direction perpendicular to the junction plane. When a wider and more directional beam of light than is possible from one diode is desired, it has been proposed to connect a plurality of light-emitting diodes electrically in series in an array. Each of the diodes in the prior-art arrays, however, functions as an independent component and is not optically coupled to an adjacent diode for stimulated emission of radiation.

By the term "light," as used herein, is meant electromagnetic radiation not only in the visible spectrum but also in the infra-red and ultra-violet regions of the electromagnetic spectrum.

SUMMARY OF THE INVENTION

Briefly stated, the novel, multilayer, light-emitting, semiconductor device comprises a stack of a plurality of relatively thin, alternately disposed layers of semiconductor material of P type and N type conductivity. Each layer forms a PN junction with an adjacent layer. A pair of parallel opposite ends of the stack are perpendicular to the PN junctions and provide reflective means for light generated within the stack. Contact means are provided on opposite surfaces of the stack to send current through the stack in a direction perpendicular to the PN junctions. When the current through the stack is at, or above, a threshold value, coherent light is generated adjacent each of the forward-biased PN junctions. The P type and N type layers of the stack are transparent enough so that the light generated adjacent each forward-biased PN junction is optically coupled to an adjacent forward-biased PN junction to effect stimulated emission of radiation. If the opposite ends of the stack are not light-reflective, the device can function as a light amplifier.

It is an object of the present invention to provide a novel, light-emitting, semiconductor device which will provide a source of light that is relatively wider, longer lasting, more directional, and more efficient than that obtainable from a single, light-emitting, semiconductor diode.

BRIEF DESCRIPTION OF THE DRAWING

The single figure of the drawing is a perspective view of a preferred embodiment of a novel, multilayer, light-emitting, semiconductor device connected in a schematic circuit.

DESCRIPTION OF THE PREFERRED EMBODIMENT

Referring now to the drawing, there is shown a novel, multilayer, light-emitting, semiconductor device 10 comprising a stack 11 of a plurality of relatively thin semiconductive layers 12–23. The layers 12–23 are of alternately disposed N type and P type conductivity. While the device 10 is illustrated in the drawing by the stack 11 of twelve layers of alternately disposed N type and P type semiconductor material, the device 10 may comprise at least four, and preferably twenty or more, layers. Each of the layers 12–23 forms a PN junction with an adjacent layer. In the embodiment shown, the layers 12, 14, 16, 18, 20, and 22 are of N type semiconductor material and form PN junctions 24, 25, 26, 27, 28, 29, 30, 31, 32, 33, and 34 with the alternate layers 13, 15, 17, 19, 21 and 23 which are of P type semiconductor material. Since any two adjacent layers in the stack 11 can be considered a semiconductor diode, it is apparent that the PN junctions 24–29 will be biased in one direction and the PN junctions 30–34 will be biased in an opposite direction if a unidirectional voltage of sufficient amplitude is applied across the stack 11 to cause a direct current to flow therethrough perpendicular to the PN junctions 24–34.

Each of the layers 12–23 of the stack 11 is of semiconductor material, such as gallium arsenide (GaAs), gallium arsenide phosphide ($GaAs_xP_{1-x}$), indium phosphide (InP), indium arsenide (InAs), gallium antimonide (GaSb), gallium indium arsenide ($GaIn_xAs_{1-x}$), or the like. The N type and P type layers 12–23 are heavily doped. For example, if the N type layers 12, 14, 16, 18, 20, and 22 are of gallium arsenide, they may be doped with tellurium to provide a donor carrier concentration of between $10^{18}$ and $5\times10^{18}$ cm.$^{-3}$. Also, if the P type layers 13, 15, 19, 21, and 23 are of gallium arsenide, they may be doped with zinc to provide an acceptor carrier concentration of between $10^{19}$ and $6\times10^{19}$ cm.$^{-3}$.

Each of the layers 12–23 is preferably rectangular in shape, between 2 and 10 mils wide, between 10 and 20 mils long, and between 1 and 2 microns thick. A typical stack 11 is 5 mils wide and 20 mils long, and a typical thickness of each of the layers 12–23 is about 1 micron. The layers 12–23 should be thin enough to be sufficiently transparent to provide optical coupling between the stimulated emission of radiation produced in adjacent diodes of the stack 11.

The stack 11 of alternately disposed layers 12–23 of N type and P type semiconductor material is formed preferably by successive epitaxial depositions of the layers from the vapor phase. One such method of depositing N type and P type layers of semiconductor material successively from the vapor phase is described in an article "The Preparation and Properties of Vapor Deposited Epitaxial $GaAs_{1-x}P_x$ Using Arsine and Phosphine," by J. Tietjen and J. Amick, in the Journal of Electrochemical Society, vol. 113, pp. 723–728, July 1966. The layers 12–23 may also be deposited epitaxially from the liquid state, as described in an article "Epitaxial Growth of GaAs and Ge From the Liquid State and its Application to the Fabrication of Tunnel and Laser Diodes," RCA Review, vol. 24, pp. 603–615, December 1965.

Opposite ends 36 and 38 of the stack 11 are optically smooth, as obtained by polishing and/or by cleavage, and are parallel to each other and perpendicular to the PN junctions 24–34. The parallel, cleaved ends 36 and 38 function as partially light-reflecting and partially light-transmitting surfaces for light (stimulated emission of radiation) generated within the device 10, as will be hereinafter explained. One of the ends 36, for example, may be made totally reflecting, by means known in the art, so that the light is transmitted only through the partially light-transmitting end 38.

A pair of opposite sides 40 and 42 of the stack 11, disposed transversely to the PN junctions 24–34, are roughened to render them non-reflective and substantially opaque to light generated within the device 10. Another means for rendering the sides 40 and 42 non-reflective is to lap them so that they are not perpendicular to the PN junctions 24–34.

Opposite surfaces of the stack 11, parallel to the PN junctions 24–34, are metalized to provide contact means for sending current through the stack 11 perpendicular to the PN junctions 24–34. To this end, a contact layer 44, as formed by the vacuum deposition of evaporated tin and by the successive, electroless depositions of nickel and gold, for example, is deposited on the exposed major surface of the layer 12 of N type semiconductor material. A contact layer 46, as formed by the successive, electroless depositions of nickel and gold, for example, is deposited on the exposed major surface of the layer 23 of P type semiconductor material. An electrical conductor 48 is soldered to the contact layer 46, as by solder 50, and a metal plate 52 is soldered to the contact layer 44. The plate 52 junctions as a heat sink for dissipating heat generated within the device 10 when operated as a light-emitting device.

The operation of the device 10 as a light-emitting device will now be explained. For continuous operation, the device 10 is preferably cooled, as by liquid nitrogen to about 77° K. For operation at room temperature (about 300° K.), the device 10 is preferably operated by pulsed currents. Let it be assumed that a unidirectional voltage, as from a power supply 53, is applied between the conductor 48 and the plate 52 so that a conventional direct current (continuous or pulsed) flows through the device 10 in a direction from the contact layer 46 to the contact layer 44, forward-biasing the PN junctions 24–29, and back-biasing the PN junctions 30–34. If this current is of at least a threshold value (about 5A), that is, a predetermined value at which a populated inversion of charge carriers is produced in each of the P type layers 13, 15, 17, 19, 21, and 23, adjacent the forward-biased PN junctions 24–29, respectively, stimulated emission of radiation takes place, and this radiation in the form of light is emitted from the ends 36 and 38 of the stack 11 if the ends are light-transmitting. If the device 10 is of GaAs, the stimulated emission is in the infra-red region of the spectrum, having a wavelength of between 8400 and 8500 A. at 77° K., depending on the current density. In practice, at least one of the ends 36 or 38 is both light-reflecting and light-transmitting. Under these conditions, the device 10 operates as a laser and coherent light, resulting from the population inversion and stimulated emission of radiation adjacent each of the forward-biased PN junctions 24–29, is emitted in substantially parallel planes, in the directions of the arrows 54 and 56.

Since the thickness of each of the layers 12–23 of the device 10 is in the order of one micron, the layers 12–23 are substantially optically transparent to the simulated emission of radiation produced adjacent each of the forward-biased PN junctions. Hence, the light generated within the device 10 adjacent each forward-biased PN junction is optically coupled to an adjacent forward-biased junction, thereby synchronizing the emission of radiation from the separate layers and forming an effectively thick, light-emitting region. Thus, current of a threshold value through the forward-biased PN junctions of the device 10 causes lasing (light amplification by stimulated emission of radiation) thereat. It is desirable that the current passing through the back-biased PN junctions does so by a tunneling action. Thus, the doping profiles of the layers 12–23 should be such as to obtain a tunneling action at the back-biased PN junctions. Suitable doping profiles in the layers 12–23 for tunneling action, well known in the art, may be obtained by controling the concentration of the dopant during the epitaxial deposition of the layers 12–23 by the aforementioned vapor deposition method, for example. If the current through the device 10 is less than the threshold value, light is emitted from the device 10, but the light is not coherent.

If the voltage applied across the device 10 by the power supply 53 is alternating, and the alternating current through the device 10 is at least of a threshold value, the PN junctions 24–29 will be forward-biased and the PN junctions 30–34 will be back-biased during each first ½ cycle of alternating current, for example, and vice versa during each second ½ cycle of alternating current. Thus, lasing takes place adjacent substantially only one half of the PN junctions of the device 10 during ½ of each cycle of alternating current, and lasing adjacent the remaining PN junctions of the device 10 takes place during the remaining ½ of each cycle. This type of operation results in cooler operation than that in prior-art, diode arrays which are operated continuously with a unidirectional voltage. Such operation permits the diode 10 to last longer than prior art, diode arrays.

The device 10 is capable of functioning as a light amplifier if it is not a resonant cavity, that is, if at least one of the opposite ends 36 and 38 of the stack 11 is not light-reflecting. The ends 36 and 38 may be rendered non-reflecting to light either by lapping them so that they are not parallel to each other, or by applying a layer of a quarter wavelength thickness of silicon monoxide to them. To operate as a light amplifier, a current of about threshold value is sent through the device 10, and light of a predetermined wavelength to be amplified is directed substantially perpendicular to the end 36. When the device 10 is operated as a light amplifier, it does not lase, but the light to be amplified should be about the same wavelength as that which the device 10 would generate if it were a laser. The amplified light emerges from the end 38. The amount of amplification produced is a function of the length of the device 10 and the amplitude of the current through it. By providing a multilayer structure, that is, a relatively large end, for the device 10, the problem of directing light to be amplified to the PN junction of the device is simplified.

What is claimed is:

1. A semiconductor device comprising:

a stack of layers of semiconductor material, each of said layers being of a conductivity type opposite to that of an adjacent layer in said stack, said layers forming a plurality of substantially parallel, PN junctions, said stack having a pair of parallel, at least partially light-reflecting, opposite ends, substantially perpendicular to said PN junctions, at least one of said ends being also partially light-transmitting, and a pair of electrical contact means on a pair of opposite surfaces, respectively, of said stack, substantially parallel to said PN junctions, for sending current through said stack, whereby to cause alternate ones of said PN junctions to be forward-biased by current of predetermined amplitude in one direction and to produce a region of population inversion and stimulated emission of radiation adjacent each forward-biased, PN junction, said radiation being emitted through said one end, each of said layers having a thickness in the order of about one micron, whereby adjacent regions of stimulated emission are optically coupled to each other.

2. A light-emitting, semiconductor device comprising:

a stack of layers of semiconductor material, each of said layers being of a conductivity type opposite to that of an adjacent layer in said stack, said layers forming at least three, successive, substantially parallel, PN junctions, said stack having a pair of parallel, at least partially light-reflecting, opposite ends, substantially perpendicular to said PN junctions, and a pair of electrical contact means on a pair of opposite surfaces, respectively, of said stack for sending current through said stack, whereby to cause alternate ones of said PN junctions to be forward biased by current in one direction and to produce a region of population inversion and stimulated emission of radiation adjacent each forward-biased, PN junction when said current is of a threshold value, said layers being optically transparent and providing optical coupling between the stimulated emission of radiation at adjacent forward-biased, PN junctions.

3. A light-emitting, semiconductor device as defined in claim 2, wherein said layers of semiconductor material comprise gallium arsenide.

4. A light-emitting semiconductor device as defined in claim 2, including, in addition, alternating current means connected to said contact means, whereby to cause said PN junctions to be forward-biased only about one-half the time during each cycle of said alternating current.

5. A multilayer, light-emitting semiconductor device comprising:

a stack of a plurality of alternately disposed, substantially quadrangular layers of semiconductor material of P type and N type conductivity, respectively, said layers forming at least three, successive, substantially parallel PN junctions, said stack having a pair of opposite surfaces and contact means on each of said surfaces, respectively, for sending current of a predetermined amplitude through said stack perpendicular to said PN junctions, whereby to bias alternate ones of said PN junctions in a forward-biased direction and to cause a population inversion and stimulated emission of light adjacent each of said forward-biased junctions, said layers being optically transparent and providing optical coupling between the stimulated emissions of light of adjacent, forward-biased PN junctions.

6. A multilayer, light-emitting, semiconductor device as defined in claim 5, wherein each of said layers of semiconductor material consists of a material chosen from the group consisting of gallium arsenide, gallium arsenide phosphide, indium phosphide, indium arsenide, gallium antimonide, and gallium indium arsenide.

7. A multilayer, light-emitting, semiconductor device as defined in claim 5, including, in addition, alternating current means connected to said contact means, whereby to bias each of said PN junctions successively in forward and backward directions during each cycle of said alternating current.

8. A semiconductor device comprising:

a stack of layers of semiconductor material, each of said layers being of a conductivity type opposite to that of an adjacent layer in said stack, said layers forming at least three substantially parallel, PN junctions, said stack having a pair of opposite ends which are substantially only light-transmitting, and a pair of electrical contact means on a pair of opposite surfaces, respectively, of said stack, substantially parallel to said PN junctions, for sending current through said stack, whereby to cause alternate ones of said PN junctions to be forward biased by current of predetermined amplitude in one direction and to produce a region of population inversion and stimulated emission of radiation adjacent each forward-biased, PN junction whereby said semiconductor device may function as an amplifier of light directed through said ends.

References Cited

UNITED STATES PATENTS 3,431,513 3/1969 Nannichi ---------- 331—94.5

RONALD L. WIBERT, Primary Examiner

P. K. GODWIN, Jr., Assistant Examiner

Notice of Adverse Decision In Interference

In Interference No. 97,672 involving Patent No. 3,514,715, W. F. Kosonocky, MULTILAYER, LIGHT-EMITTING SEMICONDUCTOR DEVICE, final judgment adverse to the patentee was rendered Mar. 31, 1972, as to claim 8.

[*Official Gazette May 30, 1972.*]